US008479003B2

(12) United States Patent
Yukawa et al.

(10) Patent No.: US 8,479,003 B2
(45) Date of Patent: *Jul. 2, 2013

(54) ELECTRONIC SIGNATURE VALIDATION SYSTEMS AND METHODS FOR ASYNCHRONOUS ENVIRONMENTS

(75) Inventors: Steven J. Yukawa, Seattle, WA (US);
Rajit Jain, Kenmore, WA (US);
Timothy W. Anstey, Seattle, WA (US);
David L. Allen, Kent, WA (US)

(73) Assignee: The Boeing Company, Chicago, IL (US)

( * ) Notice: Subject to any disclaimer, the term of this patent is extended or adjusted under 35 U.S.C. 154(b) by 998 days.

This patent is subject to a terminal disclaimer.

(21) Appl. No.: 11/507,144

(22) Filed: Aug. 21, 2006

(65) Prior Publication Data

US 2008/0046962 A1 Feb. 21, 2008

(51) Int. Cl.
*H04L 9/32* (2006.01)
(52) U.S. Cl.
USPC ........... 713/176; 713/175; 713/181; 340/981; 726/10; 726/27
(58) Field of Classification Search
None
See application file for complete search history.

(56) References Cited

U.S. PATENT DOCUMENTS

| 6,356,935 | B1 * | 3/2002 | Gibbs ........................... 709/206 |
| 2004/0158716 | A1 * | 8/2004 | Turtiainen et al. ............ 713/172 |
| 2004/0216039 | A1 | 10/2004 | Nguyen |
| 2006/0123465 | A1 | 6/2006 | Barron, Jr. |
| 2006/0136519 | A1 | 6/2006 | Batta et al. |
| 2006/0184591 | A1 | 8/2006 | Backholm et al. |

FOREIGN PATENT DOCUMENTS
WO    WO 01/55851 A1    8/2001

OTHER PUBLICATIONS

"An XML Digital Signature for Internet e-business Applications", Woo-Yong Han, et al., 0-7803-7010-4/01, 2001, IEEE.
"A Streaming Validation Model for SOAP Digital Signature", Wei Lu, et al., 0-7803-9037-7/05, 2005, IEEE.

* cited by examiner

*Primary Examiner* — Nadia Khoshnoodi
(74) *Attorney, Agent, or Firm* — Harness, Dickey & Pierce, P.L.C.

(57) ABSTRACT

A system and method for non-real-time validation of an electronically signed message transmitted via an asynchronous communications link is provided. The method includes creating an electronic message comprising an electronically signed data entry created by executing a secure data application first portion (SDA1) module hosted by a mobile system. The method additionally includes passing the message to a communications management function first portion (CMF1) module via a synchronous interface. The CMF1 module is hosted by the mobile system. The method further includes transmitting the message from the CMF1 module to a communications management function second portion (CMF2) module in a temporally delayed manner using an asynchronous communications link. The CMF2 module is hosted by a central computer system (CCS) located remotely from the mobile system. The method further yet includes validating the electronically signed entry in a temporally delayed manner utilizing a user database. The user database is hosted by the CCS and has stored thereon user account information for all users authorized to electronically sign entries transmitted from the mobile system to the CCS. The user account information includes user information and/or user personal identification numbers (PINs) for each authorized user.

24 Claims, 2 Drawing Sheets

ELECTRONIC SIGNATURE VALIDATION SYSTEMS AND METHODS FOR ASYNCHRONOUS ENVIRONMENTS

FIELD OF INVENTION

The invention relates generally to systems and methods for validating electronic signatures over asynchronous communication links.

BACKGROUND OF THE INVENTION

Today, many commercial transportation industries are continuously looking for ways to increase operating efficiencies. One result is that traditional paper intensive processes are candidates for partial or complete replacement by software solutions. Accordingly, many commercial transportation industries are implementing information technology solutions to communicate information and data between mobile platforms and remote ground based stations to improve operational efficiency. These types of communication systems often involve transmission of data and information that requires verification that the communications received are from a trusted source. Thus, the transmission of the data and information, i.e., records, must be electronically signed by the sender, i.e., the source. However, communication links between a mobile platform, e.g., aircraft, train, bus, ship, etc., and a remote ground based communication center or station are often established and maintained on a temporally limited and sporadic basis. That is, the mobile platforms are not typically in constant communication, or constantly connected, with the remote communications stations such that the transmissions of data are asynchronous. Specifically, bidirectional communication between a mobile platform and a remote communication station may have significant delays, e.g., 24 hours or more, between one entity sending a message, e.g. data packages, and that entity receiving a response to the message.

Furthermore, such commercial transportation industries must often satisfy regulatory requirements with regard to signing information transmitted by personnel onboard the mobile platforms and at the remote communication stations. To satisfy such regulatory requirements, common practice would dictate that personal digital certificates be issued for each user. However, this would require that the mobile platform and the remote communication station be in constant communication in order to achieve user validation at the time the communication, i.e., message or report, is electronically signed by the person originating the communication. Accordingly, the typical asynchronous communications that are common between the mobile platform and remote communication station are not conducive to using personal digital certificates to verify the trustworthiness of such communications. Furthermore, use of digital certificates would require issuing, constant updating and the storing of digital certificate credentials, at both the mobile platform and remote communication station, for all personnel who are authorized to sign such communications. Such requirements are onerous and can cause delays in timely operation of the mobile platform.

BRIEF SUMMARY OF THE INVENTION

In accordance with various embodiments, a method for non-real-time validation of an electronically signed message transmitted via an asynchronous communications link are provided. The method includes creating an electronic message comprising an electronically signed data entry created by executing a secure data application first portion (SDA1) module hosted by a mobile system. The method additionally includes passing the message to a communications management function first portion (CMF1) module via a synchronous interface. The CMF1 module is hosted by the mobile system. The method further includes transmitting the message from the CMF1 module to a communications management function second portion (CMF2) module in a temporally delayed manner using an asynchronous communications link. The CMF2 module is hosted by a central computer system (CCS) located remotely from the mobile system. The method further yet includes validating the electronically signed entry in a temporally delayed manner utilizing a user database. The user database is hosted by the CCS and has stored thereon user account information for all users authorized to electronically sign entries transmitted from the mobile system to the CCS. The user account information includes user information and/or user personal identification numbers (PINs) for each authorized user.

In accordance with various other embodiments, a system for non-real-time validation of an electronically signed message transmitted via an asynchronous communications link is provided. The system includes at least one onboard computer system (OCS) hosted by at least one mobile system. The system additionally includes at least one central computer system (CCS) located remotely from the at least one OCS. The CCS is configured to receive electronically signed messages from the at least one OCS via an asynchronous communications link. Additionally, the at least one CCS includes a user database having stored thereon user account information for all users authorized to electronically sign messages transmitted from the from the at least one OCS to the at least one CCS, via the asynchronous communications link.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention. Additionally, the features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
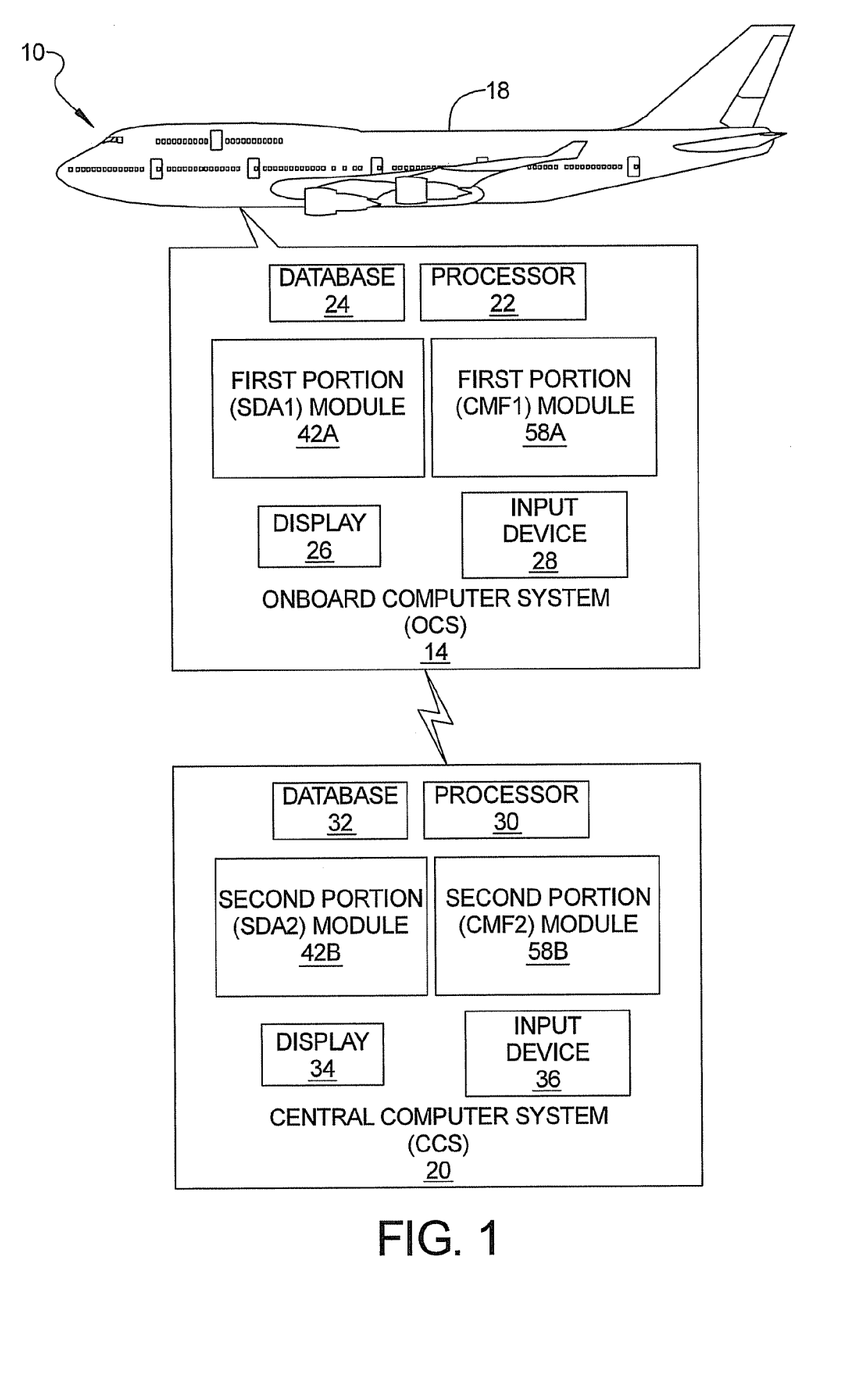
FIG. 1 is a block diagram of an electronic signature validation (ESV) system for use in asynchronous communication environments, in accordance with various embodiments of the present disclosure.

Referring to FIG. 1, an electronic signature validation (ESV) system 10 is provided for use in asynchronous communication environments, in accordance with various embodiments of the present disclosure. The ESV system 10 can be utilized by any enterprise, or business entity, desirous of electronically signing and validating information and/or data communicated between two or more computer based systems. As used herein, the term 'enterprise' is defined to mean any private, commercial or industrial unit of economic organization or activity, including one or more persons, parties, groups, associates, affiliates, contractors and/or employees. The ESV system 10 includes at least one onboard computer system (OCS) 14 hosted by at least one mobile system 18 and at least one stationary central computer system (CCS) 20 located remotely from the OCS 14 and configured to asynchronously communicate with the OCS 14. Communications between the OCS 14 and the CCS 20 can be established using any suitable wired or wireless communications link, protocol or service. For example, in various embodiments a wireless connection is established between the OCS 14 and the CCS 20 using GPRS (General Packet Radio Service), VHF, wireless IEEE 802.11 communication and/or satellite networks that implement either Internet or ACARS$^{SM}$ (Airplane Communications and Recording System) protocols.

The mobile system(s) 18 can be any mobile or portable system(s) or platform(s) from which it is desirable to send secure information to the CCS 20, via asynchronous communications. For example, the mobile system(s) 18 can be one or more portable computers (e.g., laptop computers), personal data assistants, cell phones or mobile platforms such as aircraft, trains, buses, ships or automobiles. Accordingly, although the mobile system(s) 18 is exemplarily illustrated in FIG. 1 and described herein as a single mobile platform 18, e.g., an aircraft, the scope of the present disclosure is not so limited.

The OCS 14 can be a stand alone system or a subsystem of any other computer based system and/or network component hosted by the mobile platform 18. Alternatively, the OCS 14 can comprise a combination of various subsystems and/or components of one or more other computer based systems and/or network components hosted by the mobile platform 18. For example, in various embodiments the OCS 14 is a transferable electronic, computer based system utilized by an operator of the mobile platform 18 to enhance ease and efficiency of many tasks the operator must perform during operation of the mobile platform 18. An exemplary transferable electronic, computer based system utilized by some airlines is sometimes referred to as an electronic flight bag (EFB). Alternatively, the OCS 14 can be a subsystem of an onboard local area network (LAN) or any other onboard mobile platform control system.

Generally, the OCS 14 includes at least one processor 22, at least one database 24, a display 26 and input device 28. The processor(s) 22 is/are operable for executing all functions of the OCS 14. Particularly, the OCS processor(s) 22 executes various software applications, algorithms, functions, and/or modules stored on one or more OCS electronic storage devices (not shown) and utilized or implemented during operation of the ESV system 10, as described herein. The OCS electronic storage device(s) can be any computer readable media suitable for electronically storing the software applications, functions, algorithms and/or modules executed by the OCS processor(s) 22. For example, the OCS electronic storage device(s) can be a hard drive, a Zip drive, a CDRW drive, a thumb drive or any other electronic storage media. The OCS database(s) 24 can be any electronic memory device(s), i.e. computer readable media, for storing large quantities of data organized to be accessed and utilized during various operations of the ESV system 10. For example, the OCS database(s) 24 can have stored thereon a plurality of look-up tables, operational and maintenance data, operational and maintenance procedures and report forms for access and use by the ESV system 10.

The display 26 is utilized for illustrating graphical and textual data, forms and other information, and the input device 28 can be any suitable device for inputting data and information to the OCS, such as a keyboard, mouse, stylus, touch screen or joy stick. It should be understood that the OCS processor, database, display and input device 22, 24, 26 and 28 can be components of a stand alone computer based system or components of one or more other onboard systems, such as an onboard LAN or an onboard mobile platform control system, that collectively comprise the OCS 14. Alternatively, the OCS 14 can be a stand alone system that is connectable to another onboard system, e.g. an onboard LAN, such that various ones of the OCS processor, database, display and input device 22, 24, 26 and 28 are included in the stand alone OCS 14 and others are included in the other system. Additionally, it should be understood that the various software applications, functions, algorithms and/or modules executed by the processor(s) 22 during operation of the ESV system 10 can be stored on one or more OCS electronic storage devices included in a single onboard device, or in one or more onboard devices.

The CCS 20 can be any computer-based system or combination of networked infrastructures located remotely from the OCS 14. For example, the CCS 20 can be a stand alone computer based system or an aggregated system comprising various systems, components and modules from a plurality of networked computer based systems. Generally, the CCS 20 includes at least one processor 30, at least one database 32, at least one display 34, and at least one input device 36. The CCS display(s) 34 can be any display(s) suitable for visually presenting graphics, text and data to a user of the ESV system 10. The CCS input device(s) 36 can be any device(s) adapted to input data and/or information into CCS 20, for example a keyboard, a mouse, a joystick, a stylus, a scanner, a video device and/or an audio device.

The CCS database(s) 32 can be any electronic memory device(s), i.e. computer readable media, for storing large quantities of data organized to be accessed and utilized during various operation of the ESV system 10. For example, the CCS database(s) 32 can have stored thereon a plurality of look-up tables, operational and maintenance data, operational and maintenance procedures and report forms for access and use by the ESV system 10. The CCS processor(s) 30 is/are operable for executing all functions of the CCS 20. Particularly, the CCS processor(s) 30 executes various software applications, functions, algorithms and/or modules stored on one or more CCS electronic storage devices (not shown) and utilized or implemented during operation of the ESV system 10, as described herein. The CCS electronic storage device(s) can be any computer readable media suitable for electronically storing the software applications, functions, algorithms and/or modules executable by the CCS processor 30. For example, the CCS electronic storage device(s) can be a hard drive, a Zip drive, a CDRW drive, a thumb drive or any other electronic storage device.

Figure 2:
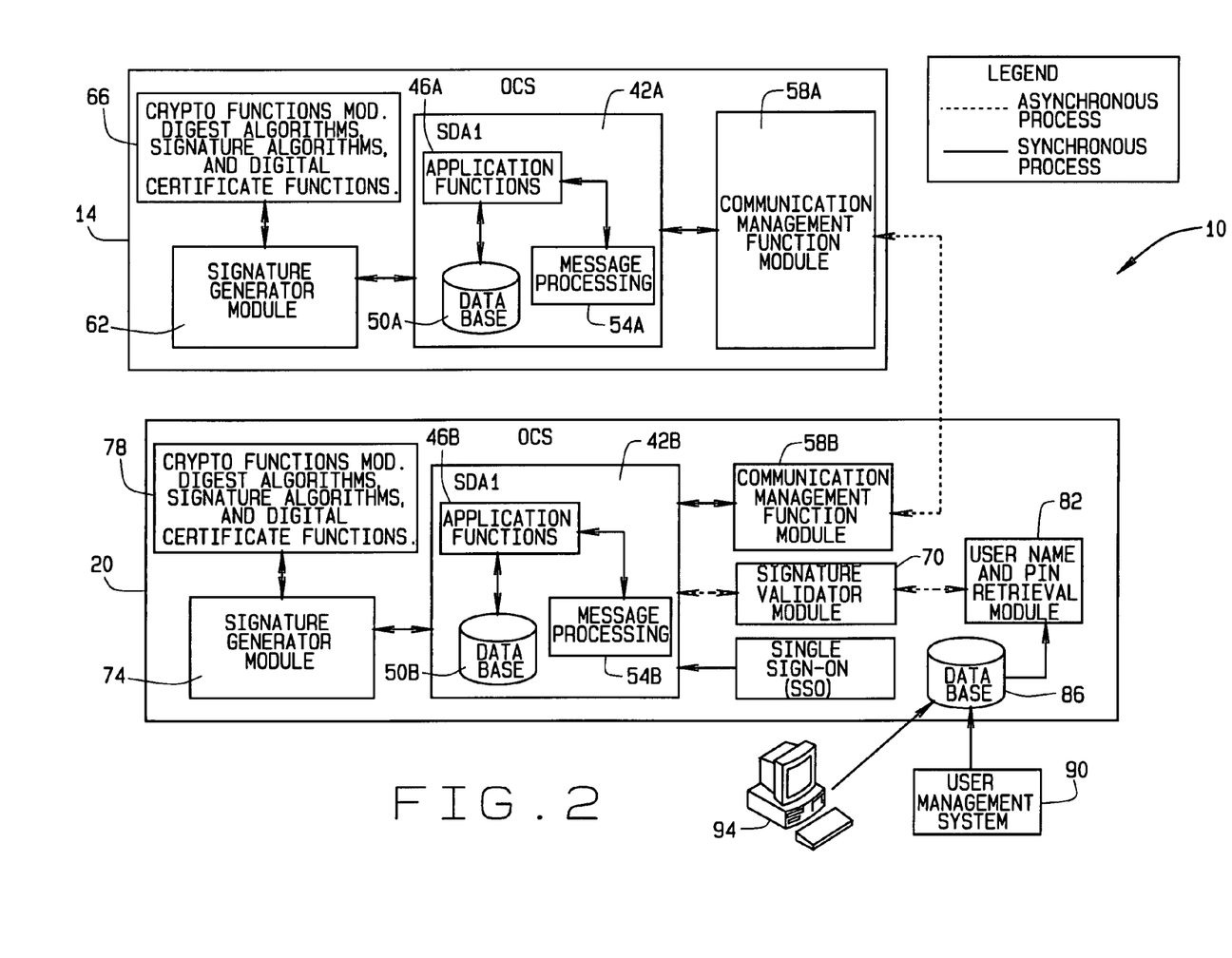
FIG. 2 is a block diagram illustrating the ESV system shown in FIG. 1 in greater detail and further illustrating the communication paths between the various components of the ESV system, in accordance with various embodiments.

Referring now to FIGS. 1 and 2, as described above, the OCS and CCS processor(s) 22 and 30 execute various software applications, functions, algorithms and/or modules stored on one or more OCS and CCS electronic storage devices (not shown). More specifically, the various software applications, algorithms and/or modules are executed by the respective processors 22 and 30 to implement operation of the ESV system 10. It should be noted that the various software applications, functions, algorithms and/or modules will sometimes be referred to herein as 'components' of the OCS 14 and CCS 20, or of the ESV system 10. Furthermore, although the description of the ESV system 10 is described herein in terms of the various components, i.e., various software applications, functions, algorithms and/or modules, having a direct effect on, and direct control of the ESV system 10, it should be understood that it is the instructions generated by the execution of various software applications, functions, algorithms and/or modules by the OCS and CCS processors 22 and 30, and the subsequent implementation of such instructions by the OCS and CCS processors 22 and 30 that have direct effect on, and direct control of the ESV system 10.

FIG. 2 is a block diagram illustrating the various components included in the OCS 14 and the CCS 20 of the ESV system 10 and the communication paths between the various components, in accordance with various embodiments. It should be noted that, in accordance with various embodiments, solid communication path indicators, or arrows, indicate generally synchronized communication between the respective components, while the dotted or dashed communication path indicators, or arrows, represent generally asynchronous communication between the respective components.

In accordance with various embodiments, the OCS 14 includes a secure data application first portion (SDA1) module 42A and the CCS 20 includes a secure data application second portion (SDA2) module 42B. The SDA1 module 42A and the SDA2 module 42B are cooperating portions of a comprehensive secure data application (SDA) 42 that are hosted at separate locations within the ESV system 10, but are cooperatively executable to perform all the functions of the SDA 42, as implemented by the ESV system 10. Accordingly, the SDA1 module 42A and the SDA2 module 42B are comprehensively referred to herein as the secure data application (SDA) 42. The SDA 42 can be any software application evoked by a user of the ESV system 10 to perform a specific action, operation or procedure, via the OCS 14 and/or the CCS 20, that requires the user to utilize a user specific electronic signature. For example, the SDA 42 can be an electronic logbook application utilized by a crew member onboard the mobile platform 18 to electronically enter fault reports, maintenance actions, discrepancy reports and/or travel logs to be sent to the CCS 20 that must be electronically signed by the crew member. Or, similarly, the electronic logbook application can be utilized by maintenance personnel to electronically enter maintenance reports to be sent to the mobile platform 18 that must be electronically signed by the maintenance personnel.

The SDA1 module 42A includes one or more SDA1 functions 46A that include software applications and algorithms utilized during execution of the SDA1 module 42A, and more particularly, during execution of the SDA 42. Additionally, the SDA1 module 42A includes an SDA1 database 50A that is accessible by the SDA1 functions 46A. Furthermore, the SDA1 module 42A includes a SDA1 message processing application 54A that interfaces with the SDA1 functions 46A and a communications management function first portion (CMF1) module 58A, also included in the OCS 14. The SDA1 message processing application 54A processes messages, data and information communicated between the CMF1 module 58A and the SDA1 functions 46A. Specifically, messages sent and received through the CMF1 module 58A are processed at the application-level via the SDA1 message processing application 54A. The SDA1 message processing application 54A interfaces with the CMF1 module 58A and the SDA1 functions 46A. When sending a message from the SDA1 functions 46A, the SDA1 message processing application 54A generates a CMF1-compliant message. When receiving a message from another SDA1 module 42A, or the CCS 20, the SDA1 message processing application 54A extracts the data and sends it to the SDA1 functions 46A for a transaction against the SDA1 database 50A.

Generally, the SDA1 functions 46A facilitate the transfer of data among modules or components and maintain the business logic of the SDA1 module 42A. The SDA1 functions 46A interface directly with the SDA1 database 50A and the message processing application 54A. SDA1 entries from the CCS 20 or the OCS input device 28 are not processed directly into the SDA1 database 50A. In various embodiments, each transaction must be passed through a business and data logic layer of the SDA1 functions 46A to ensure the data adheres to application business rules (e.g. required data present) and structure. However, the scope of the present disclosure should not be so limited.

The SDA1 database 50A stores all SDA1 related information and entries, including mobile platform travel information, defects, maintenance actions and deferrals, maintenance parts and tasks, service logs, information entries, maintenance releases, entry author information, and user account information. Additionally, the SDA1 database 50A maintains a list of transactions representing all actions against the SDA1 module 42A. Entries in the SDA1 database 50A may not be altered or deleted, only new entries identifying the action taken are stored and related to previous entries. Additionally, information such as the date and time the signature was applied to the entry can be stored in the SDA1 database.

Similarly, the SDA2 module 42B includes one or more SDA2 functions 46B that include software applications and algorithms utilized during execution of the SDA2 module 42B, and more particularly, during execution of the SDA 42. Additionally, the SDA2 module 42B includes an SDA2 application database 50B that is accessible by the SDA2 functions 46B. Furthermore, the SDA2 module 42B includes a SDA2 message processing application 54B that interfaces with the SDA2 functions 46B and a communications management function second portion (CMF2) module 58B, also included in the CCS 20. The SDA2 message processing application 54B processes messages, data and information communicated between the CMF2 module 58B and the SDA2 functions 46B. Specifically, messages sent and received through the CMF2 module 58B are processed at the application-level via the SDA2 message processing application 54B. The SDA2 message processing application 54B function interfaces with the CMF2 module 58B and the SDA2 functions 46B. When sending a message from the SDA2 module 42B, the SDA2 message processing application 54B generates a CMF2-compliant message. When receiving a message from another SDA2 module 42B or one or more OCSs 14, the SDA2 message processing application 54B extracts the data and sends it to the SDA2 functions 46B for a transaction against the SDA2 database 50B. Additionally, the SDA2 message processing application 54B will also send the message to a signature validator 70, as described below.

As with the SDA1 functions 46A, the SDA2 functions 46B facilitate the transfer of data among processes and maintain the business logic of the SDA2 module 42B. The SDA2 functions 46B interface directly with the SDA2 database 50 and the message processing application 54B. SDA2 entries are not processed from a message from the OCS 14 or the CCS input device 36 directly into the SDA2 database 50B. In various embodiments, each transaction must be passed through a business and data logic layer of the SDA2 functions 46B to ensure the data adheres to application business rules (e.g. required data present) and structure. However, the scope of the present disclosure should not be so limited. Additionally, The SDA2 database 50B stores all SDA2 related information and entries, including maintenance actions, maintenance service logs, maintenance releases, entry author information, and user account information. The SDA2 database 50B also maintains a list of transactions representing all actions against the SDA2 module 42B. Entries in the SDA2 database 50B may not be altered or deleted, only new entries identifying the action taken are stored and related to previous entries.

The CMF1 module 58A and the CMF2 module 58B are cooperating portions of a comprehensive communications management function (CMF) 58 that are hosted at separate locations within the ESV system 10, but are cooperatively executable to perform all the functions of the CMF 58, as implemented by the ESV system 10. Accordingly, the CMF1 module 58A and the CMF2 module 58B are comprehensively referred to herein as the communications management function (CMF) 58.

The comprehensive communication management function (CMF) 58 is the primary messaging component in the ESV system 10. Particularly, the CMF 58 is responsible for communicating messages, i.e., sending and receiving data, information, correspondence, reports, etc., between the one or more OCSs 14 and the one or more CCSs 20. Each of the SDA1 module 42A and the SDA module 42B directly interfaces with the respective CMF1 and CMF2 modules 58A and 58B for messaging functions. Among its many functions, the CMF 58 abstracts data link selections from each of the SDA1 and SDA2 modules 42A and 42B. Any encoding or segmentation required to send messages between the OCS(s) 14 and the CCS(s) 20, via a particular data link, is accomplished by the CMF 58. Generally, messages will either be encrypted or an encrypted data link will be used when transmitting messages between the OCS(s) 14 and the CCS(s) 20. In various embodiments, upon receiving a message, the respective CMF1 or CMF2 module 58A or 58B checks the integrity of the message by performing two 16-bit CRC checks. The first check is against the respective CMF1 or CMF2 module 58A or 58B header and the second check is against the body of the message. If either check fails, a failure message (NACK) is returned to the sending SDA1 or SDA2 module 42A or 42B.

In accordance with various embodiments, the OCS 14 further includes an OCS signature generator module 62 and an OCS cryptographic functions module 66. The OCS signature generator module 62 interfaces with, and is utilized by, the SDA1 module 42A to generate electronic signatures when a user of the OCS 14 evokes the SDA application 42 to perform a specific action, operation or procedure that requires the user to apply an electronic signature specific to the user. More particularly, in various embodiments, the purpose of the signature generator module 62 is to electronically sign entries made utilizing the SDA1 module 42A. As described in detail below, when making entries into the SDA1 module 42A, the author, or user, will provide user account information such as first and last name, a personnel identification number, and personal identification number (PIN). As used herein, the phrase personal identification number and the acronym PIN will be understood to mean an alphanumeric string known to the user.

The SDA1 module 42A sends the entry and author information requiring the electronic signature to the OCS signature generator module 62. The OCS signature generator module 62 interfaces with the OCS cryptographic functions, module 66 to create a formatted string, e.g., an XML string according to the W3C XML signature standard, that is interpretable by the CMF1 module 58A, and returns the formatted string to the SDA1 module 42A. In various embodiments, the OCS cryptographic functions module 66 contains algorithms for computing a cryptographic hash, signing the hash, and retrieving a hardware electronic certificate. In various embodiments, the hardware electronic certificate includes a dynamic certificate created by an intermediate certificate authority (not shown) issued by the particular enterprise implementing the ESV system 10.

The dynamic certificate contains an identification number of the mobile system 18 on which the OCS 14 resides (e.g., an airplane tail number) and identifies the source hardware (e.g., a serial number of the particular OCS 14). The benefit of this private/public key is that it is created and stored locally, i.e., onboard the respective mobile system 18, and uniquely identifies the OCS 14. The dynamic certificate is used as part of the signature captured for an entry made utilizing the SDA1 module 42A as the means to ensure the integrity of the entry during transmission to the CCS 20. A signature validator module 70 of the CCS 20, described further below, will check the dynamic certificate against the intermediate certificate authority and verify that the intermediate certificate authority has not expired or been revoked. Note that the signature validator asynchronously interfaces, or communicates, with the SDA2 module 42B.

Furthermore, the CCS 20 includes a CCS signature generator module 74 and a CCS cryptographic functions module 78. As described further below, the CCS signature generator module 74 interfaces with the SDA2 module 42B and the CCS cryptographic functions module 78, and is utilized by the SDA2 module 42B to decode the electronic signatures of messages received from OCS 14. Additionally, in various embodiments, the CCS 20 includes a user specific information and PIN retrieval (USIPR) module 82 that interfaces with the signature validator module 70 and one or more user databases 86. Note that the USIPR module 82 asynchronously interfaces, or communicates, with the signature validator module 70.

Referring particularly to FIG. 2, operation of the ESV system 10 will now be described, in accordance with various embodiments. Once a user of the OCS 14, e.g., a crew member of the mobile platform 18, initiates execution of the SDA1 module 42A the user inputs an entry into the SDA1 module 42A, via the OCS input device 28. The user then reviews and signs entry, by entering user specific information such as the user's first and last name, personnel ID, and personal identification number (PIN). It should be understood that the user specific information and PIN for each authorized user of the SDA 46 is issued by a respective enterprise and stored in the user database 86. The SDA1 module entry and user account information are then related and stored in SDA1 database 50A. The SDA1 module 42A interfaces with, or calls, the OCS signature generator module 62 to communicate the entry information and/or data, and the user specific information to the OCS signature generator module 62.

The OCS signature generator module 62 then interfaces with the OSC cryptographic functions module 66 to create a formatted representation, e.g., an XML string, of the SDA1 module entry and signature, that is interpretable by the CMF1 module 58A. As described above, in various embodiments, the OCS cryptographic functions module 66 can add a hardware digital certificate to the entry and signature, i.e., to the formatted representation. Accordingly, to create the formatted representation, the OSC cryptographic functions module 66 generates a hash value of the data being signed, including the user account information, using a cryptographic hash function such as SHA-1. The OSC cryptographic functions module 66 then creates an electronic signature by signing the hash value using the OCS hardware electronic certificate and a cryptographic algorithm such as RSA. In various alternative embodiments, a personal digital certificate could be included in the formatted message returned by the OCS signature generator module 62.

The SDA1 module 42A formats a representation of the entry and signature from the OCS signature generator module and generates a message, including the formatted representation, to be sent to the CCS 20. The SDA1 module 42A then calls, or interfaces with the CMF1 module 58A, to deliver the message to the CMF1 module 58A and send the message to the CCS 20, particularly to the CMF2 module 58B. In various embodiments, the CMF1 module 58A generates a 16-bit CRC for the message header and a separate 16-bit CRC for the message body. The CMF1 module 58A then sends the message over an encrypted asynchronous data link to the CCS 20, more particularly, to the CMF2 module 58B. That is, either the message can be encrypted or the data link can be encrypted. Note that in accordance with various embodiments, the communication between the CMF1 and CMF2 modules is an asynchronous process.

The CCS CMF2 module 58B receives the message, which could be approximately simultaneously with the OCS CMF1 module 58A sending the message, i.e., effectively real time, or any period of time after the CMF1 module 58A sends the message. For example, the CMF2 module 58B could receive the message 30 seconds to 24 hours or longer after the CMF1 module 58A sends the message.

In various embodiments, the CMF2 module 58B evaluates the message integrity by checking the CRC value of the message header and the message body. If either check fails, a message indicating the failure is sent back to the CMF1 module 58A and the original message is not retained in the SDA1 database 50A. However, if both CRC checks are successful, the CCS SDA2 module 42B is notified by the CMF2 module 58B that the CMF2 module 58B has a message. The SDA2 module 42B then retrieves the message and begins to process it. Collaboratively, the CMF2 module 58B and the SDA2 module 42B ensure that the information contained in the received message has not changed in anyway. The SDA2 module 42B then processes the message, extracting the entry and user account information, and stores the entry and user account information in the SDA2 database 50B. For example, the first and last name, personnel ID, user name, and PIN of the message author is saved in the SDA2 database 50B, along with a reference to a unique reference, e.g., a primary key, of the entry.

Once the entry and user account information has been stored in the SDA2 database 50B, the SDA2 module 42B calls the CCS signature generator and cryptographic functions modules 74 and 78 to deconstruct the message. The SDA2 module 42B then sends the desconstructed message to the signature validator module 70 for processing within a defined period, e.g., within 6, 12, 24 or 48 hours. To verify that the electronic signature is valid, the signature validator module 70 hashes the deconstructed signature using the same hash function as used by the OCS cryptographic functions module 66 to hash the original entry and electronic signature. The signature validator module 70 then compares the newly computed hashed signature to the hashed signature received from the CMF1 module 58A. If the hashes do not match, then either the data or the signature has changed and therefore the integrity of the data is not assured. The SDA2 module 42B is then notified that signature is invalid. If the newly computed hashed signature and the hashed signature received from the CMF1 module 58A match, then the signature is valid.

If the signature is determined to be valid, the signature validator module 70 sends the user account information to the user specific information and PIN retrieval (USIPR) module 82 to verify the user account information is correct, i.e., the user account information designates an authorized user of the SDA module 46. The USIPR module 82 accesses the user database 86 to determine if the author of the signature is an authorized user of the SDA module 46. If a match is found, then a message is sent to the SDA2 database 50B identifying the record as validated. However, if a match is not found, then a notification is sent to the SDA2 module 42B. Regardless of success or failure, a message is sent to the SDA2 module 42B indicating whether or not the signature was determined to be valid.

As described above, when making entries into the SDA1 module 42A, the author of the entry will provide personal information such first and last name, personnel identification number, and personal identification number (PIN), i.e., user specific information. The PIN is a shared-secret supplied by the respective enterprise user management system 90 for each person, or user, authorized to make entries into the SDA module 46, i.e., authorized to make entries to either the SDA1 module 42A or the SDA2 module 42B. In various embodiments, the PINs are stored in the user database 86. The enterprise can populate the user database 86 automatically through back-office integration to the user management system 90 or manually through a user interface 94 to the user database 86. As set forth above, the signature validator module 70 interfaces with the USIPR module 82 when checking the validity of a PIN provided as part of an SDA1 module 42A entry. Additionally, in substantially the same manner as described above with respect to an entry to the SDA1 module 42A, the signature validator module 70 interfaces with the USIPR module 82 when checking the validity of a PIN provided as part of a SDA2 module 42B entry. However, differences, although minor, do exist between generating and signing an entry using the OCS SDA1 module 42A versus performing the same actions using the CCS SDA2 module 42B. The primary difference is in the order of sending a signature for validation. The SDA2 module 42B sends a copy of the signature attached to an entry to the signature validator module 70 as well as to the CMF1 module 58A of the OCS 14. In contrast, the SDA1 module 42A sends the entry directly to the CMF2 module 58B and SDA2 module 42B of the CCS 20, which in turn sends a copy to the signature validator module 70.

Thus, the ESV system 10 can validate electronic signatures using an asynchronous communications link(s) between the OCS(s) 14 and the CCS(s) 20 such that real time validation is not required. Therefore, when a message is received from the OCS 14 and enters the CCS 20, the message can still be processed by the SDA2 module 42B and stored in the CCS database 50B and can be acted upon prior to validation of the message occurring. Additionally, the user name and PIN retrieval data is stored in the user database 86 at the CCS 20 and not at the OCS 14. Therefore, the mobile system 18 is insulated from performing validation and PIN retrieval processes of the ESV system 10. The ESV system 10 combines hardware security certificates with personnel Identification numbers and personal identification numbers (PIN's) to form an electronic signature that does not require the need for real time validation. Accordingly, users of the SDA 46 can sign entries from either the OCS 14 or the CCS 30 regardless of communication link availability between the OCS 14 and the CCS 30. For example, a link between the OCS 14 and the CCS 30 does not need to exist when an entry is generated and electronically signed for the signature to be applied to the entry.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electronic signature validation system, said system comprising:
　at least one onboard computer system (OCS), wherein the OCS is a subsystem removable from at least one control system configured as part of a mobile vehicle the OCS including:
　a signature generator module configured to assist in generating a digital signature for a communication being sent by the OCS to at least one central computer system (CCS) located remotely from the at least one OCS, wherein the signature generator module receives user information;
　a cryptographic module in communication with the signature generator module configured to:
　　receive the user information from the signature generator module;
　　generate a cryptographic hash;
　　create the digital signature by signing the cryptographic hash based on the user information received from the signature generator module; and
　　receive a dynamic certificate that is supplied to the OCS by an entity remote from the OCS that is operating the system, and that uniquely identifies the OCS that has generated the communication and the mobile vehicle that the OCS is located on;
　the at least one remote CCS configured to receive the signed cryptographic hash that forms the digital signature, and to receive the dynamic certificate from the at least one OCS via a wireless, asynchronous communications link, the at least one CCS comprising:
　　a user database having stored thereon user account information for all users authorized to digitally sign messages transmitted from the at least one OCS to the at least one CCS, via the asynchronous communications link; and
　　a signature validator module configured to check the dynamic certificate against a certificate authority to validate the dynamic certificate and to validate the digital signature against all authorized users stored in the user database.

2. The system of claim 1, wherein the at least one OCS comprises a secure data application first portion (SDA1) module and a communications management function first portion (CMF1) module that synchronously interfaces with the SDA1.

3. The system of claim 2, wherein the at least one CCS further comprises:
　a secure data application second portion (SDA2) module;
　a communications management function second portion (CMF2) module that synchronously interfaces with the SDA1; and
　wherein the signature validator module asynchronously interfaces with the SDA2.

4. The system of claim 3, wherein the at least one CCS further comprises a user name and personal identification number (PIN) retrieval module that asynchronously interfaces with the signature validator module and is configured to retrieve user information and PINs from the user database and asynchronously transmit the user information and PINs to the signature validator module to validate the digital signature.

5. A method for validation of a digitally signed message transmitted via an asynchronous communications link, said method comprising:
　in a mobile vehicle, creating an electronic message comprising a digitally signed data entry by executing a secure data application first portion (SDA1) module configured in an onboard computer system (OCS) being a removable subsystem of a control system configured as part of the mobile vehicle, the digitally signed data entry forming a digital signature on the data entry using user information and including a hardware electronic certificate supplied by a remote operator of the mobile vehicle, where the hardware certificate uniquely identifies the mobile vehicle and the OCS being operated from the control system configured as part of the mobile vehicle;
　a remotely located central computer system (CCS), where the electronic message is communicated from the mobile vehicle to the CCS;
　passing the electronic message, comprising the digitally signed data entry and hardware certificate, to a communications management function first portion (CMF1) module via a synchronous interface, the CMF1 module configured in the OCS;
　transmitting the electronic message, comprising the digitally signed data entry and the hardware certificate, from the CMF1 module to a communications management function second portion (CMF2) module in a time delayed manner using an asynchronous communications link, the CMF2 module configured in the CCS located remotely from the OCS; and
　validating the electronic message, wherein validating the electronic message comprises:
　　validating the digitally signed data entry in a time delayed manner utilizing a user database to compare the digitally signed data entry, wherein the user database is stored in the CCS, and wherein the user database stores user account information for all users authorized to digitally sign data entries transmitted from the OCS to the CCS, the user account information comprising at least one of user information and a user personal identification number (PIN) for each authorized user of the OCS; and
　　validating the hardware certificate against a certificate authority to validate the hardware certificate.

6. The method of claim 5, wherein digitally signing the entry comprises entering the user account information specific to a user that is executing the SDA1 to create digital signature used to digitally sign the entry, the user account information specific to the user comprising at least one of user information specific to the user and a PIN specific to user.

7. The method of claim 6, wherein creating the electronic message further comprises storing the entry and the user account information in an SDA1 database included in the SDA1 module.

8. The method of claim 6, wherein validating the digitally signed entry comprises:

passing the received electronic message from the CMF2 module to a secure data application second portion (SDA2) module configured in the CCS, via a synchronous interface; and passing the electronic message from the SDA2 module to a signature validator module, via a synchronous interface, to validate the digital signature, the signature validator module configured in the CCS.

9. The method of claim 8, wherein validating the digitally signed entry comprises evoking a user specific information and PIN retrieval (USIPR) module, configured in the CCS, to access the user database to verify that the user account information is included in the digital signature.

10. The method of claim 5, wherein creating the electronic message further comprises passing the digitally signed entry to a signature generator module and a cryptographic functions module via synchronous interfaces to convert the digitally signed entry to a formatted data string that forms the electronic message and is interpretable by the CMF1 module, the signature generator module and the cryptographic functions module configured in the OCS.

11. The method of claim 10, wherein converting the digitallly signed entry to a formatted data string comprises encrypting the formatted data string.

12. The method of claim 5, wherein transmitting the message from the CMF1 module to the CMF2 module in a time delayed manner, comprises transmitting the message using an encrypted asynchronous communications link between the CMF1 module and the CMF2 module.

13. A method for temporally delayed validation of an digitally signed message transmitted from an onboard computer system (OCS) being operated on an aircraft to a remotely located central computer system (CCS) via an asynchronous communications link, said method comprising:

creating an electronic message comprising digitally signed data entry, wherein the digitally signed data entry forms a digital signature on the data entry using user information and including a hardware electronic certificate supplied by a remote operator of the aircraft, wherein the hardware electronic certificate uniquely identifies both the aircraft and the OCS operated from the aircraft and the digitally signed data entry further being created by executing a secure data application first portion (SDA1) module configured in the OCS operating in the aircraft, wherein the OCS is a removable subsystem of a control system configured as part of the aircraft, and the electronic message comprising the electronically digitally signed data entry and the hardware electronic certificate being communicated from the aircraft to the remotely located CCS;

passing the electronic message, comprising the digitally signed data entry and electronic certificate, to a communications management function first portion (CMF1) module via a synchronous interface, the CMF1 module configured in the OCS operating on the aircraft;

transmitting the electronic message, comprising the digitally signed data entry and the hardware electronic certificate from the CMF1 module to a communications management function second portion (CMF2) module in a time delayed manner using an asynchronous communications link, the CMF2 module configured in the CCS located remotely from the aircraft;

validating the electronic message, wherein validating the electronic message comprises:

validating the digitally signed data entry in a time delayed manner utilizing a user database to compare the digitally signed data entry, wherein the user database is stored in the CCS, and wherein the user database stores user account information for all users authorized to digitally sign entries transmitted from the aircraft to the CCS, the user account information comprising at least one of user information and a user personal identification number (PIN) for each one of a plurality of authorized users of the OCS; and validating the electronic certificate against a certificate authority to validate the hardware electronic certificate.

14. The method of claim 13, wherein digitally signing the digitally signed data entry comprises entering the user account information specific to a user that is executing the SDA1 to create the digital signature used to digitally sign the digitally signed entry, the user account information being specific to the user and comprising at least one of user information specific to the user and a PIN specific to the user.

15. The method of claim 14, wherein validating the electronically signed data entry comprises:

passing the received electronic message from the CMF2 module to a secure data application second portion (SDA2) module configured in the CCS, via a synchronous interface; and passing the electronic message from the SDA2 module to a signature validator module, via a synchronous interface, to validate the digital signature, the signature validator module being configured in the CCS.

16. The method of claim 15, wherein validating the digitally signed data entry comprises evoking a user specific information and PIN retrieval (USIPR) module, hosted by the CCS, to access the user database to verify that the user account information included in the digital signature is valid.

17. The method of claim 13, wherein creating the electronic message further comprises passing the digitally signed data entry to a signature generator module and a cryptographic functions module via synchronous interfaces to convert the digitally signed data entry to a formatted data string that forms the electronic message and is interpretable by the CMF1 module, the signature generator module and the cryptographic functions module configured in the OCS on the aircraft.

18. The method of claim 17, wherein the hardware electronic certificate resides on the aircraft and hosts the SDA1 module, the hardware electronic certificate including a dynamic certificate that contains the identification number of the aircraft on which the OCS resides.

19. The method of claim 17, wherein converting the digitally signed data entry to a formatted data string comprises encrypting the formatted data string.

20. The method of claim 17, wherein converting the digitally signed data entry to a formatted data string comprises formatting the electronic message to include a personal digital certificate specific to the user using the signature generator module.

21. The method of claim 13, wherein transmitting the message from the CMF1 module to the CMF2 module in a time delayed manner, comprises transmitting the message using an encrypted asynchronous communications link between the CMF1 module and the CMF2 module.

22. The method of claim 13, further comprising permanently maintaining a list of transactions representing all actions against the SDA1 module an SDA1 database included in the SDA1 module.

23. The method of claim 22, wherein the list of transactions includes a date and a time the digital signature was generated and applied to the digitally signed data entry.

24. The method of claim 13, wherein passing the electronic message to the CMF1 module via a synchronous interface comprises checking the integrity of the electronic message using the CMF1.

* * * * *